United States Patent [19]
Sommerfield

[11] Patent Number: 5,332,082
[45] Date of Patent: Jul. 26, 1994

[54] CONVEYOR TURN DRIVE

[76] Inventor: Ronald L. Sommerfield, 4660 Paper Birch La., Traverse City, Mich. 49684

[21] Appl. No.: 35,724

[22] Filed: Mar. 23, 1993

[51] Int. Cl.5 .............................................. B65G 15/02
[52] U.S. Cl. .................................. 198/831; 198/840; 198/842
[58] Field of Search ............... 198/831, 835, 839, 840, 198/842, 838

[56] References Cited

U.S. PATENT DOCUMENTS

| | | | |
|---|---|---|---|
| 1,823,483 | 9/1931 | Bausman | 198/831 X |
| 3,100,565 | 8/1963 | Fry | 198/831 X |
| 4,024,949 | 5/1977 | Kleysteuber et al. | 198/831 |
| 4,067,439 | 1/1978 | Janitsch | 198/831 X |
| 4,179,026 | 12/1979 | DeVries | 198/831 X |
| 4,185,737 | 1/1980 | Blattermann | 198/831 |

FOREIGN PATENT DOCUMENTS

| | | | |
|---|---|---|---|
| 3326688 | 3/1984 | Fed. Rep. of Germany | 198/831 |
| 3421413 | 12/1985 | Fed. Rep. of Germany | 198/831 |
| 2577907 | 8/1986 | France | 198/831 |
| 0042508 | 3/1983 | Japan | 198/831 |
| 609235 | 9/1948 | United Kingdom | 198/831 |

*Primary Examiner*—D. Glenn Dayoan
*Attorney, Agent, or Firm*—Glenn B. Morse

[57] ABSTRACT

A corner conveyor having a flat endless carrying belt is supported on a frame defining an arcuate conveying path. Either the upper or the lower course, or both, are driven by pinch rollers located at an intermediate point around the turn. The conveyor preferably has a hollow guide rail around the outer periphery of the turn, and the belt has spaced rollers adjacent its outer edge engaging the inside of the hollow rail above and below a slot receiving the belt. The drive mechanism engages the belt portion that extends radially outward from the guide rollers.

2 Claims, 6 Drawing Sheets

CONVEYOR TURN DRIVE

BACKGROUND OF THE INVENTION

Conveyors have become the backbone of most industrial operations, moving parts and materials from one work station to another. A common form of the conveyor is based upon a wide belt carried by rollers, or by a skid plate, depending upon the load that is carried. Strictly linear movement is only a minor design problem, but turning a flat belt in the plane of its width is another matter. The belt buckles along the inner periphery of the turn, if the same belt used for the linear movement is deflected around any substantial deviation from a straight line. The solution to the problem has been a separate unit forming a turn in the conveyor path. Carried objects are transferred from the linear section to the corner at their end points, so that the corner section forms a continuation of the linear system.

The corner conveyor is based on arcuate sections of belt joined at their ends to form a continuous band, and is carried by a frame with rollers positioned to establish upper and lower courses, one overlying the other. This endless belt is typically driven either at the end rollers, or by deviating the lower course of the belt around drive rollers at an intermediate location around the turn. The belt is thus forced into a serpentine path that aggravates wear and installation problems, as well as requiring considerable structure associated specifically with the drive.

The placement of the belt has been improved by receiving the outer edge in a slot in a tubular guide rail. The belt can then be provided with a plurality of rollers spaced along a line somewhat inward from the outer edge (with respect to the radius of the turn), so that these rollers can bear on the radially outer surface of the slotted face of the rail (which would be the inside of the tubular configuration). This interengagement maintains the arcuate path, which might otherwise be distorted by belt tension.

SUMMARY OF THE INVENTION

The present invention centers in the drive system for a conveyor of the type outlined above. Driving force is applied at an intermediate point around the turn by pinch rollers engaging the belt between them under pressure at a position preferably radially outward from the line of rollers, with respect to the axis of the turn. Depending on the load and other conditions, the drive may be applied to the lower course of the belt, the upper course, or to both courses. In any of these, the force may be applied at one or more positions around the curve. In some applications, the driving force can be applied at the inner edge of the belt. The driving mechanism is preferably secured to the outside of the hollow guide rail, which becomes an integral part of the frame of the conveyor. A cut-out may be made in the guide rail, so that parts of the drive system can extend inward for engagement with the belt.

DESCRIPTION OF PREFERRED EMBODIMENTS

Figure 1:
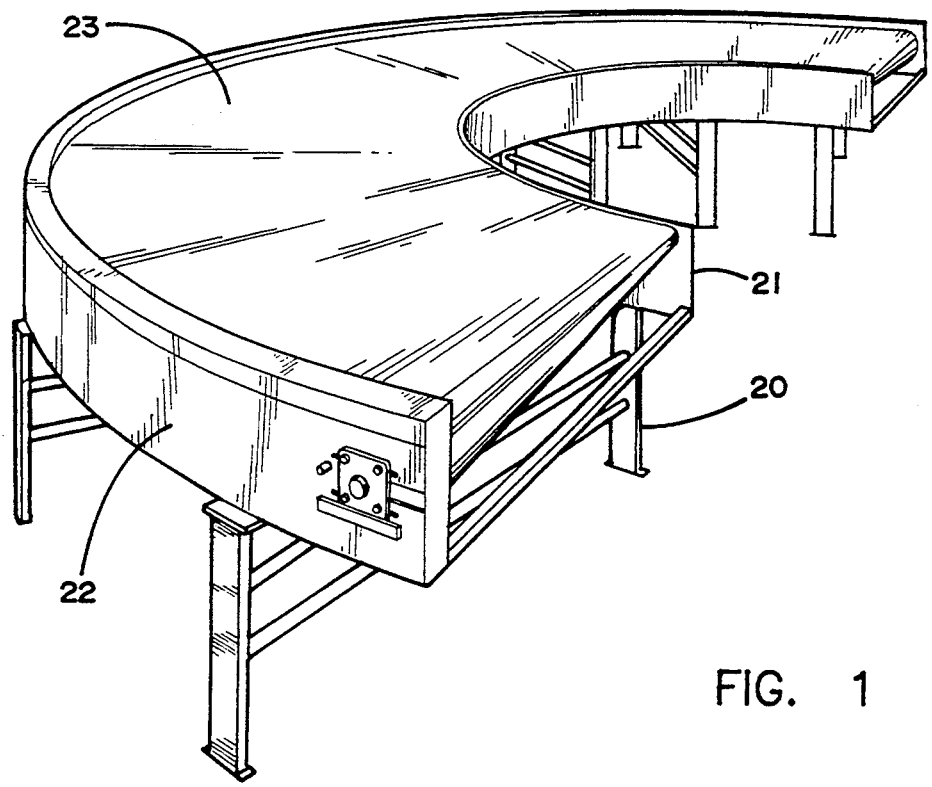
FIG. 1 is a perspective view of a corner conveyor providing a turn of 180 degrees.

The conveyor illustrated in FIG. 1 provides a 180 degree turn that would normally be connected to the ends of adjacent parallel linear conveyors. The particular unit illustrated in this view happens to have an effective carrying width of 84 inches, and an outside radius of 13 feet 2 inches. This section of the total conveyor system has its own frame including the leg structure generally indicated at 20, the inside rail 21, and the outside rail 22. The belt 23, if laid out flat, would be ring-shaped. It is folded approximately on a diameter, however, producing upper and lower courses of the belt. If a piece of belt material large enough to provide the entire ring configuration is not conveniently available, it is made up of several sector-shaped pieces Joined at their ends by the usual belt-splicing devices. Depending on the load carried by the conveyor, the belt can be supported either by rollers or by a skid plate forming part of the frame of the machine. The end rollers defining the diametral turning points of the belt are sufficiently small that the unit can be joined to the adjacent linear conveyors with a small enough discontinuity so that the movement of articles carried by the conveyor is not disturbed.

Figure 2:
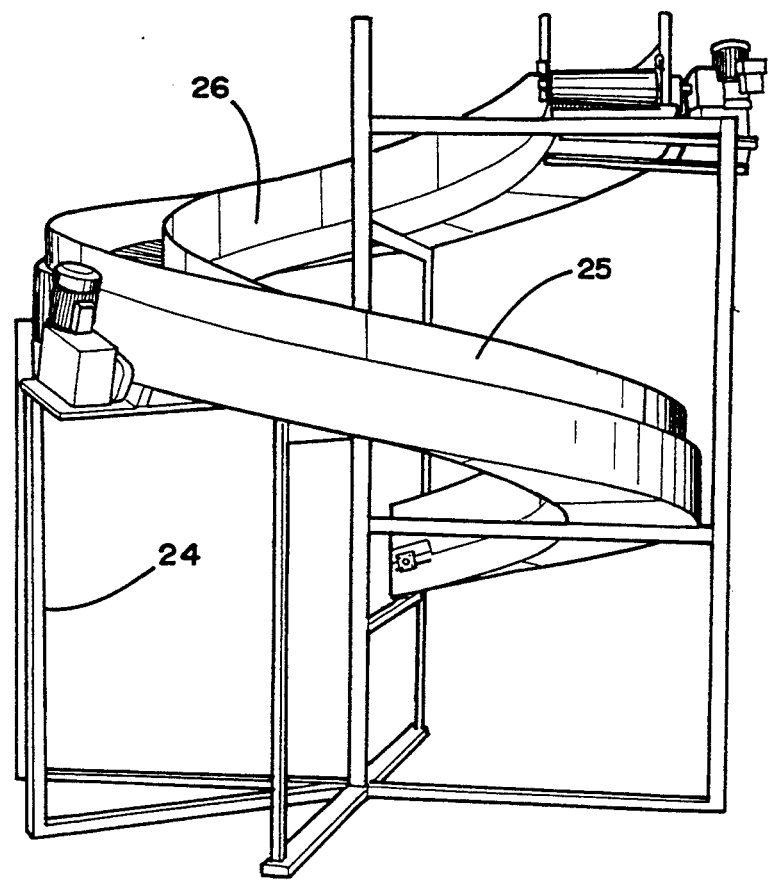
FIG. 2 is a perspective view of a spiral conveyor adapted to provide a conveying path from a lower to an upper level, as well as providing a change of direction.

When a unit of this type is connected to linear conveyors, it is obvious that only one position across the width of the belt of the curved conveyor can correspond exactly with the velocity of the linear conveyor. The curve velocity at the outer periphery decreases with a decrease in the radius from the axis of the turn. This condition results in the general practice of establishing the belt velocity around the turn according to the needs of the particular conveying system. Frequently, the linear conveyor velocity is used as the average turn velocity established at the center of the belt width. These conveyors, however, have such a wide variety of applications that the needs of particular systems may differ over a considerable range. The belt widths, for example, may well be less than a foot in some applications, and the weight and stability of items carried by the conveyor will determine whether or not there will be a tendency for the carried objects to tumble out of position at encountering sudden changes in velocity. FIG. 2 illustrates another variable that may have to be considered in determining the velocities and dimensional details of the turn section. In FIG. 2, the turn becomes a spiral which is capable of inducing considerable changes in elevation, as well as accommodating the unit to a variety of angular relationships between the successive sections of linear conveyors. The belt for the spiral conveyor must necessarily be made up of a series of sector-shaped portions so that they can be overlaid to produce the desired configuration. In this case, the frame of the device would include the leg structure generally indicated at 24 and the spiral outer and inner rails 25 and 26, respectively.

Figure 3:
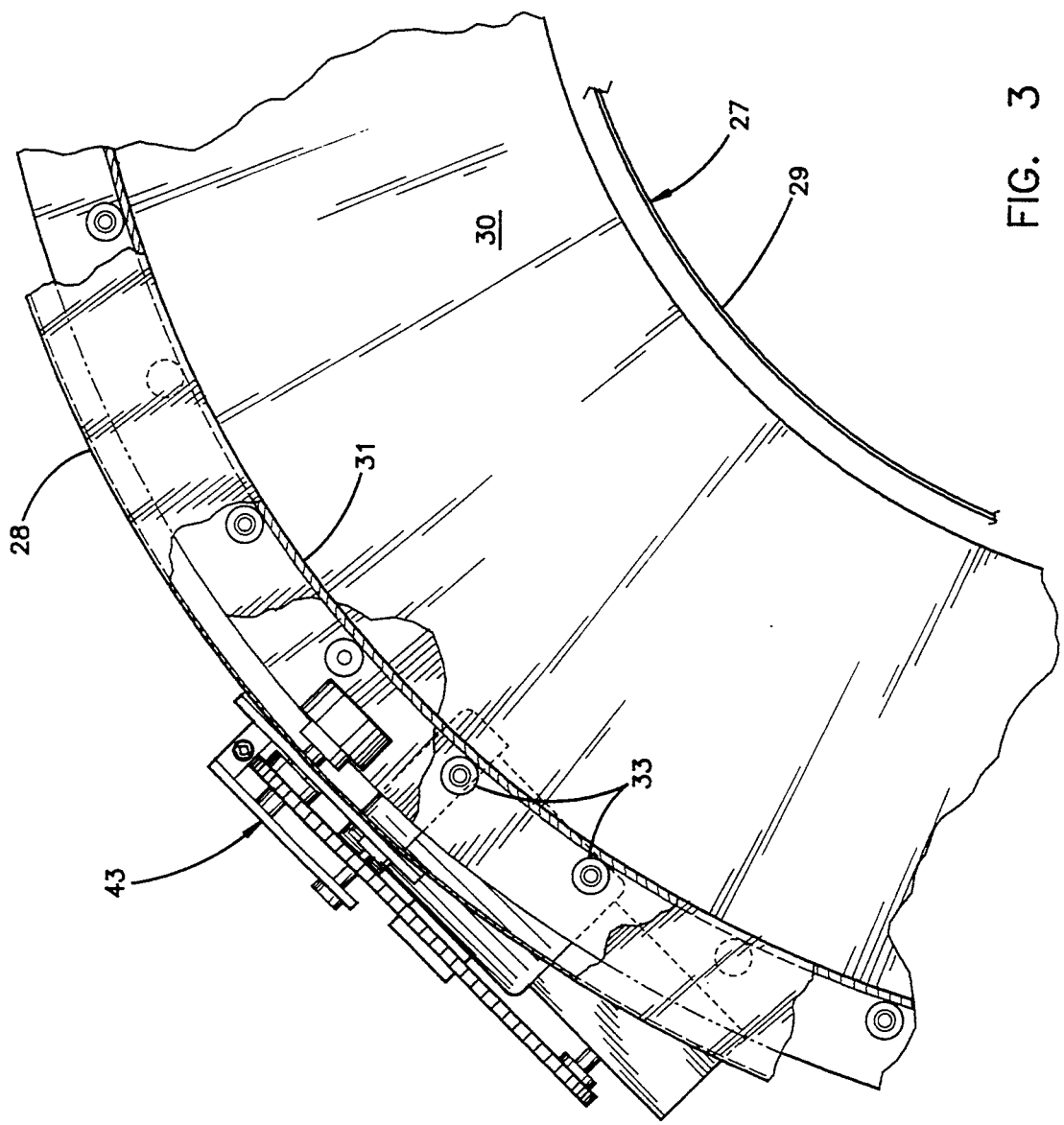
FIG. 3 is a fragmentary plan view showing a drive system mounted at an intermediate point around a conveyor turn.
Figure 9:
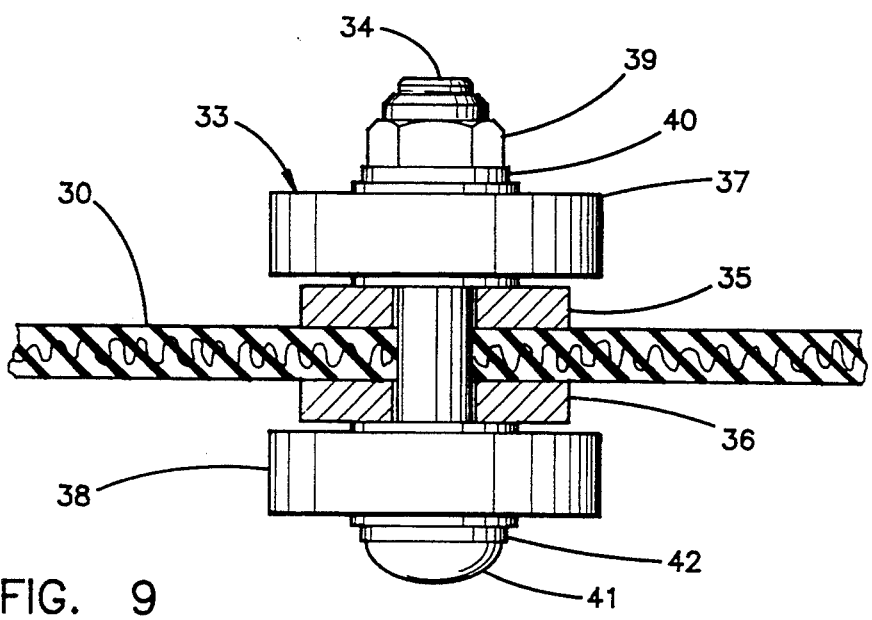
FIG. 9 is a section showing the installation of the bearing rollers adjacent the outer periphery of the belt.

Referring to FIG. 3, a portion of a turn conveyor is generally indicated at 27. The entire unit may either cover a 180 degree sector, or a small fraction of that extent. In any case, the structure will include the outer rail 28, the inner rail 29, and the belt 30. A guide rail 31 wall forming part of the outer rail structure is slotted to receive the upper course 30a (refer to FIG. 4) of the belt, which rides on a bed structure indicated at 32 forming part of on the frame of the machine. A series of guide rollers 33 is secured to the belt along a line parallel to the outer edge for engagement with the guide rail 31 above and below the slot engaged by the belt. The lower (return) course of the belt is engaged in a similar slot in the portion of the guide rail 31 opposite the path of the lower course. The mounting of the roller assemblies on the belt is illustrated in FIG. 9. A bolt 34 traverses the belt 30, and also the bearing washers 35 and 36. The standard roller units 37 and 38 are essentially ball bearings with the outer race adapted for bearing engagement with various objects. The inner hubs of these roller units are constructed to extend axially somewhat beyond the planes of the outer faces of the rollers, so that bearing pressure can be applied to secure the rollers in position without interfering with the movement of the rollers. Pressure can thus be applied at the nut 39 (which is preferably of the self-locking variety) through the washer 40 down through the assembly to the head 41 of the bolt which rests on the bearing washer 42. The hubs of the rollers engage the central bearing washers 35 and 36, so that the forces established by the adjustment of the nut 39 ultimately clamp the belt 30 securely with respect to the roller assembly.

The drive assembly 43 (refer to FIGS. 3, 4, and 5) is secured to the frame at the outer rail 28. The drive system includes the standard motor unit 44 and a transmission system which ultimately drives the upper and lower pinch rollers 45 and 46, respectively. These rollers are connected operatively to the motor unit by a chain 47 engaging appropriate sprockets on the shafts 48 and 49 carrying the rollers 45 and 46. The upper shaft 48 is carried by the pivot frame 50 having the lugs 51 extending down to a pivot bolt 52 engaging the fixed frame 53 mounted on the outer rail 28, and secured by the bolts 54–57. Preferably, a cut out is made in the outer rail 28 defining an opening inside the bolts 54–57 into which the transmission assembly can be inserted.

A clamping action between the upper and lower pinch rollers is established by the spring 58 traversed by the bolt 59 in threaded engagement with the cross bar 60 forming part of the fixed frame 53. The bolt 59 also traverses a shelf 61 of the pivot frame 50, but with clearance. The spring 58 is adapted to bear on the shelf, with the spring 58 thus entrapped between the shelf and the adjustment nut 62. The resulting spring force tends to rotate the pivot frame 50 in a counter clockwise direction, as viewed in FIG. 5, and ultimately produces a clamping force between the upper and lower pinch rollers 45 and 46. These rollers are preferably provided with a conventional covering material having a relatively high coefficient of friction against the material of the belt.

Figure 4:
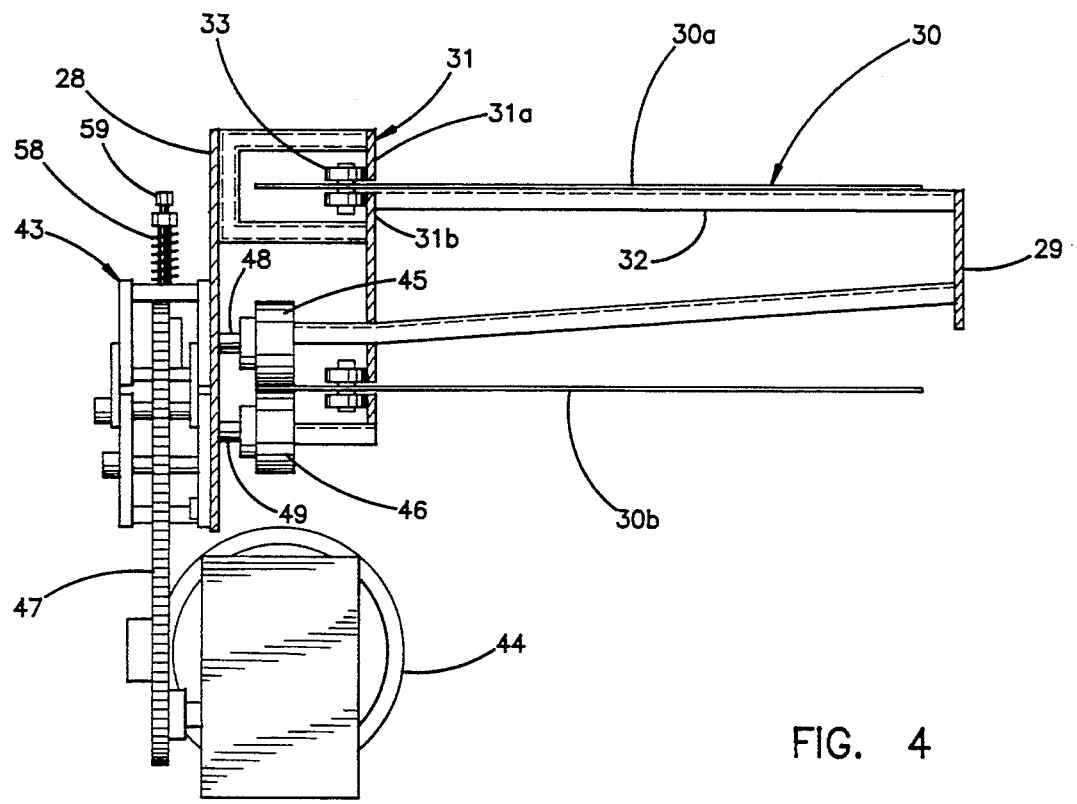
FIG. 4 is a sectional elevation through the drive mechanism.
Figure 5:
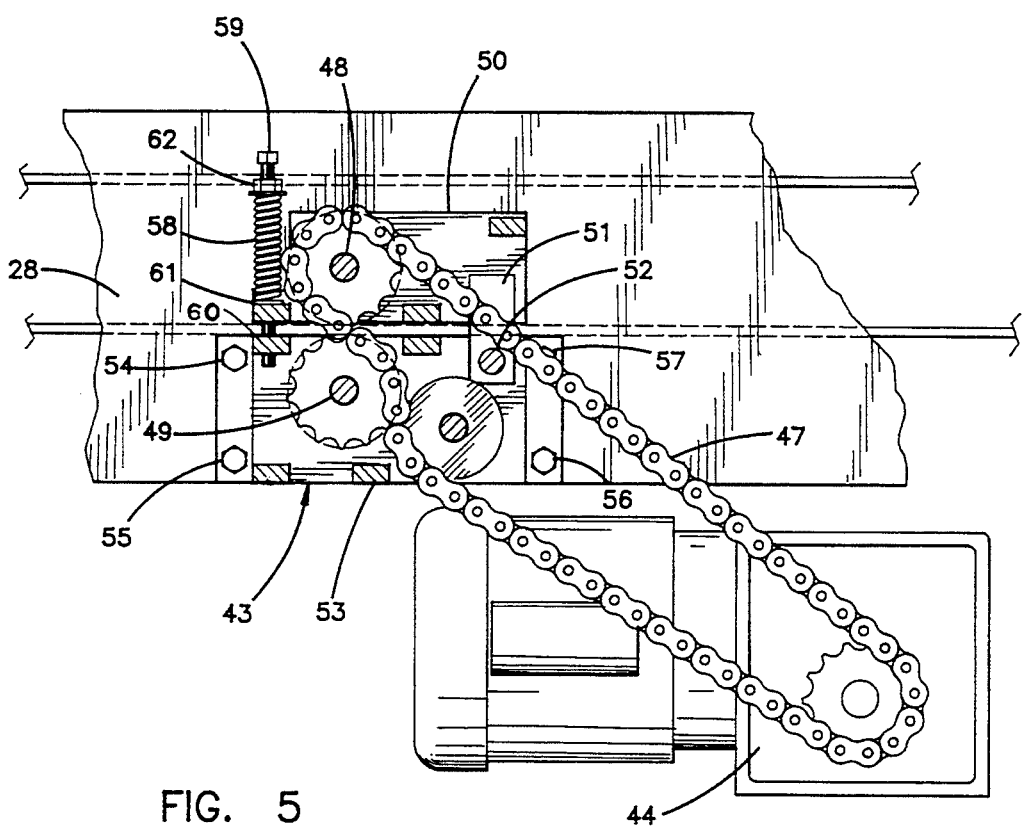
FIG. 5 is an exterior elevation of the drive system appearing in FIGS. 3 and 4.
Figure 6:
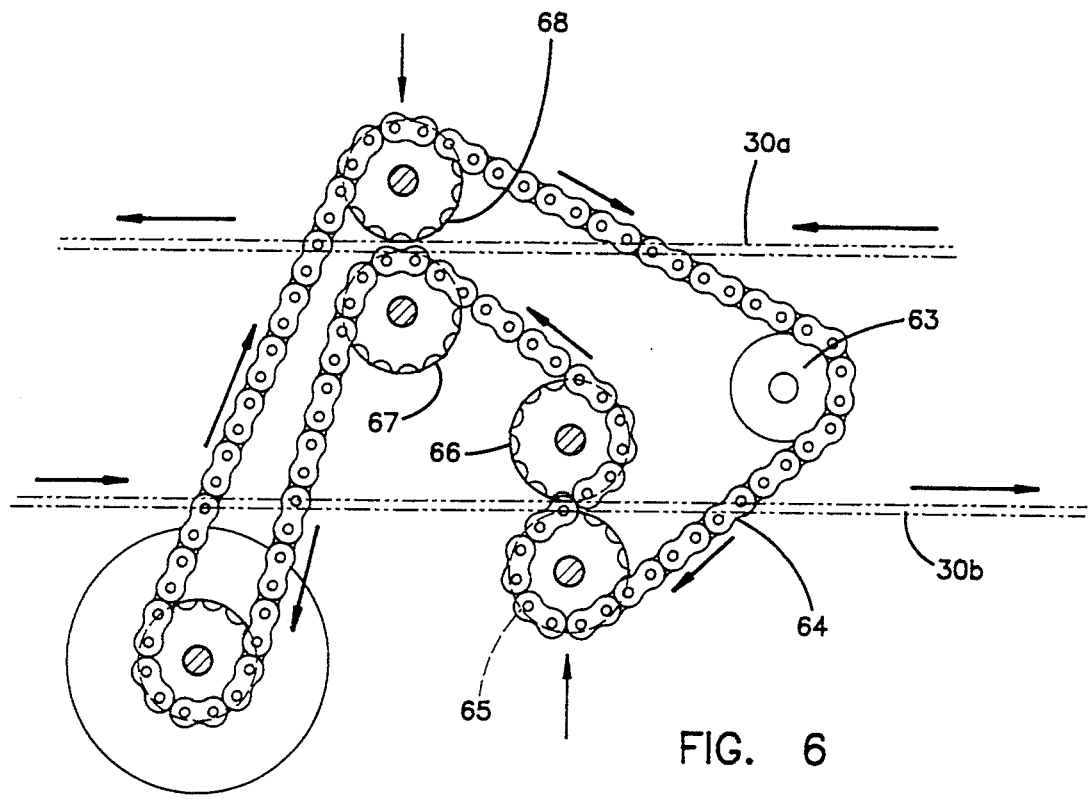
FIG. 6 is a schematic view showing a modified arrangement of the driving system.

The arrangement shown in FIGS. 4 and 5 produces a driving action against the lower course 30b of the conveyor belt. Depending upon the load conditions and other variables, the drive can also be applied to the upper course, or to both courses. FIG. 6 shows schematically the latter arrangement, with the addition of an idler sprocket 63 to establish the necessary path for the chain 64. Each of the belt courses 30a and 30b has its own pair of pinch rollers 65–66 and 67–68. The pinching action may be generated by an arrangement of the type shown in FIG. 5, but applied to both an upper and a lower pivoted frame.

Figure 7:
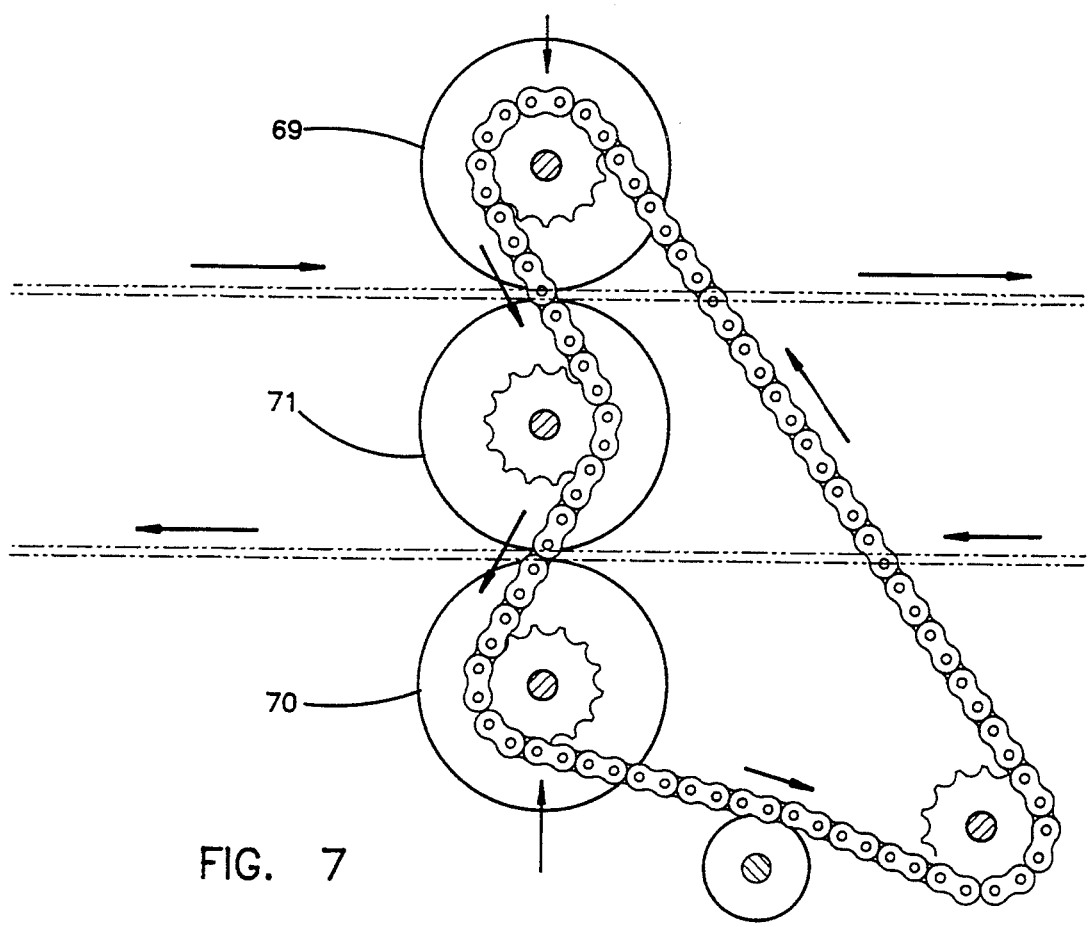
FIG. 7 presents a further modification of the driving system with respect to the location of the pinch rollers.
Figure 8:
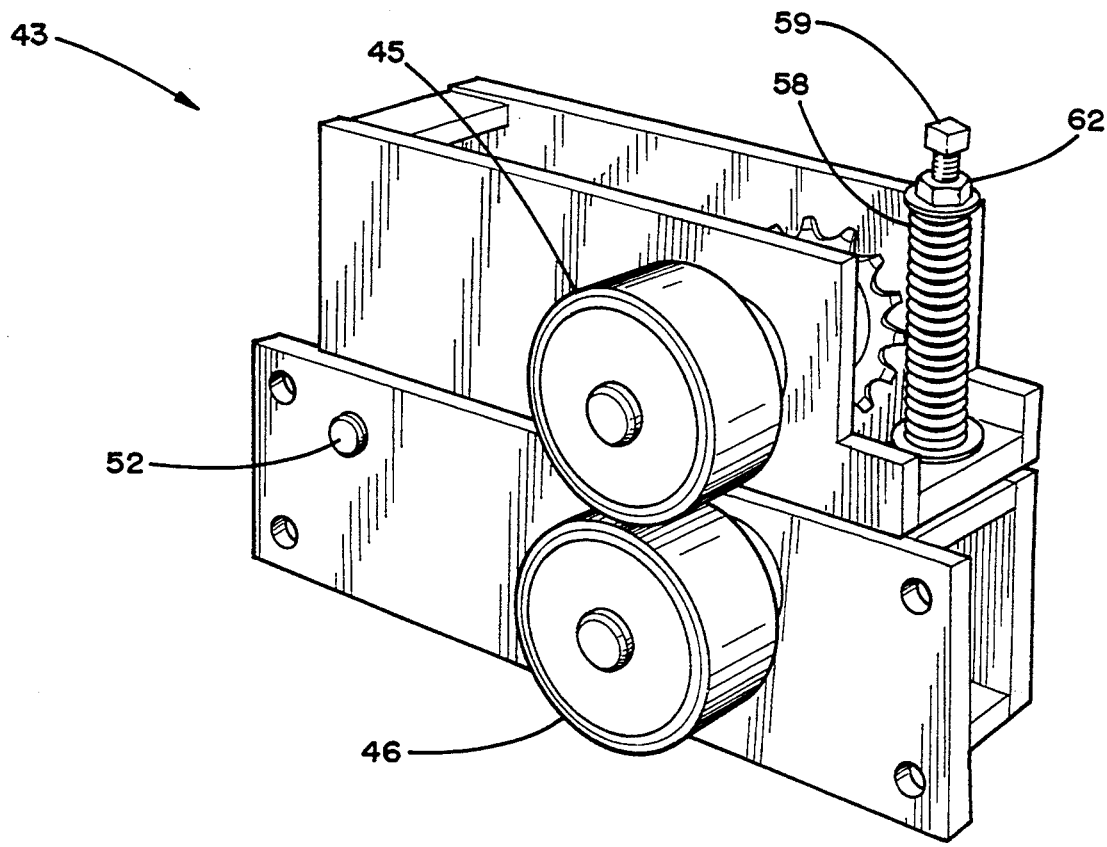
FIG. 8 is a perspective view of the assembly responsible for applying the driving force to the belts. The motor unit is omitted from this view.
Figure 10:
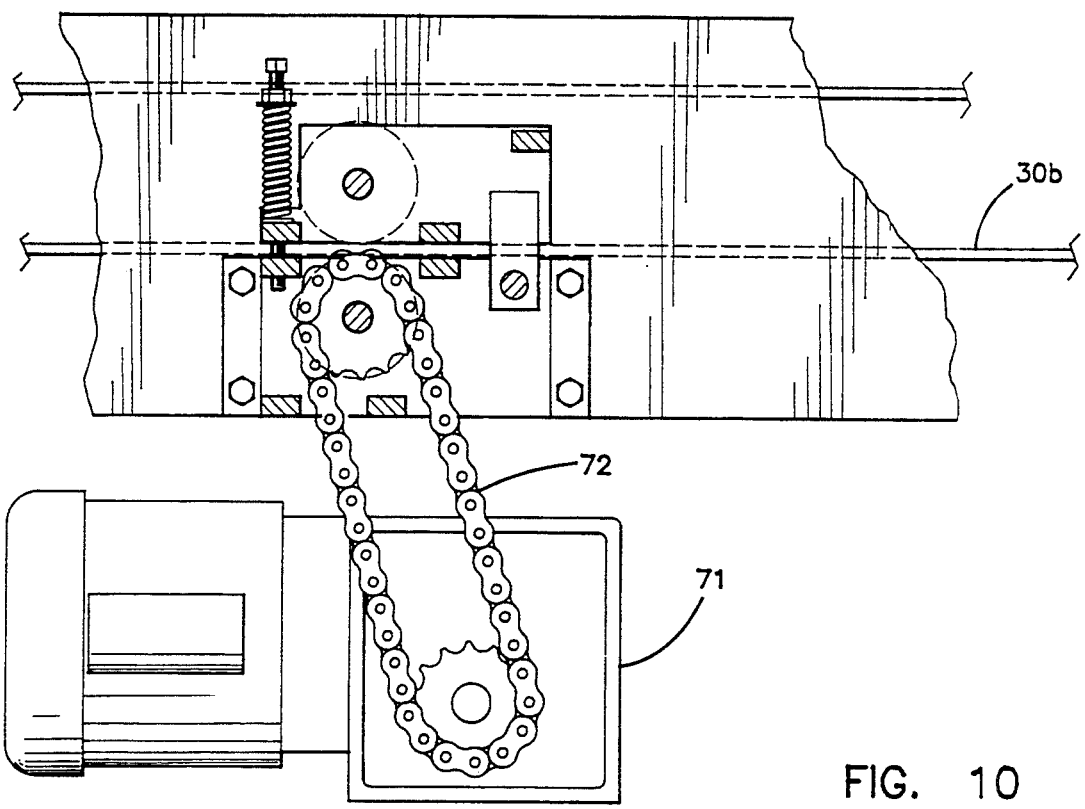
FIG. 10 illustrates a further modification of the drive system, in which driving power is applied to only one of the two pinch rollers, with the opposite roller functioning as an idler.
Figure 11:
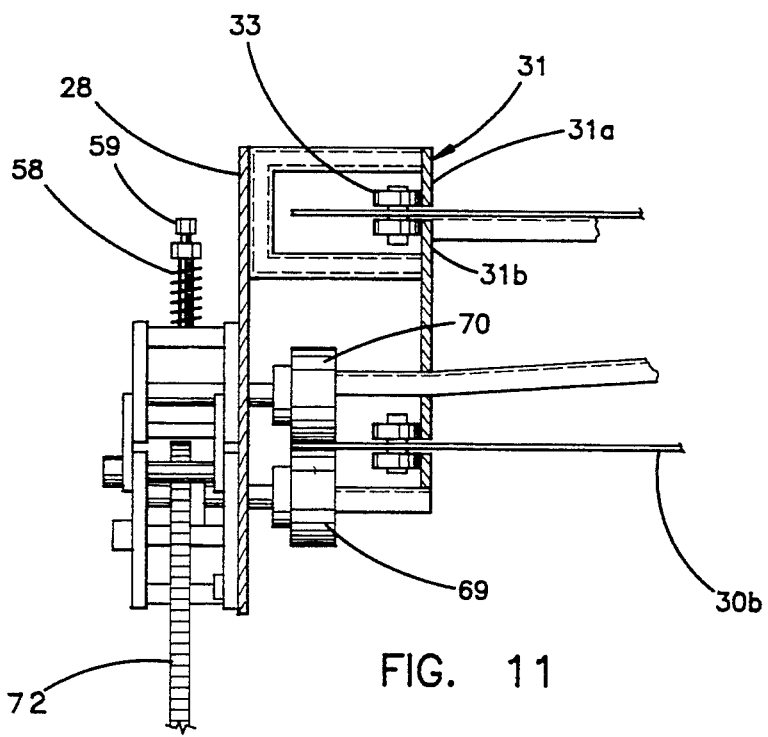
FIG. 11 is a side elevation with respect to FIG. 10.

The arrangement shown in FIG. 7 can involve upper and lower pinch rollers 69 and 70 biased toward a central roller 71. In FIG. 10, a simplified arrangement is illustrated where the driving forces are fairly low. Here, the driving power is limited to the lower pinch roller 69, with the upper roller 70 acting as an idler with which pressure can be applied. The motor 71 simply drives the lower roller 69 directly through the chain 72. The same pivoted frame system is used for generating pressure between the rollers.

I claim:

1. A conveyor having a frame including a belt-supporting means defining a turn, arcuate endless belt means carried by said supporting means and providing upper and lower courses, said belt means having inner and outer edges with respect to said turn, said belt means also including a plurality of guide rollers spaced radially inward from said outer edges, and drive means for said belt means, wherein the improvement comprises:

an assembly constituting said drive means and including pinch rollers normally gripping at least one of said courses between them radially outward from said guide rollers, and motor means adapted to drive said pinch rollers in a direction to advance said belt means around said turn.

2. A conveyor as defined in claim 1, wherein said frame includes a hollow rail having inner and outer walls, said inner wall having a slot receiving said belt means, and said outer wall having an aperture receiving a portion of said drive means, said drive means being secured to said outer wall.

* * * * *